Figure 2:
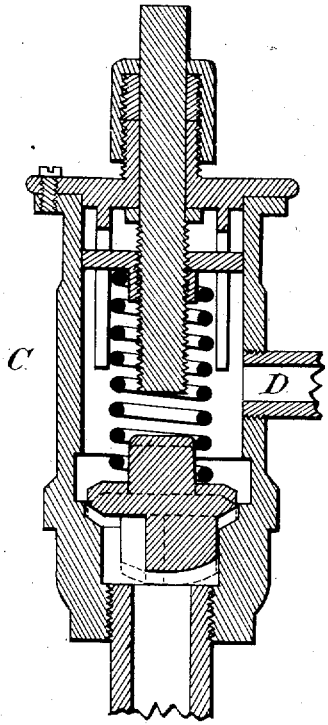
Figure 1:
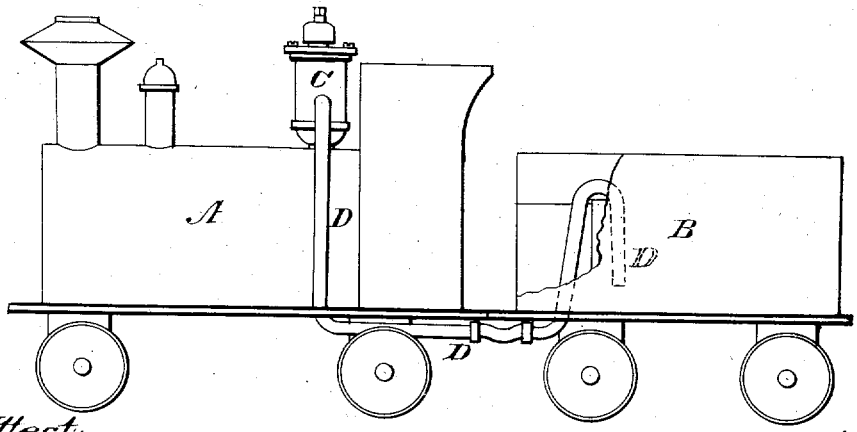

H. G. ASHTON.

Assignor, by mesne assignments, to the ASHTON VALVE Co.

Safety-Valve Attachment to Utilize Escape Steam.

No. 8,211. Reissued May 7, 1878.

Attest:
F. B. Brock
D. S. Stuart

Inventor:
Henry G. Ashton
per A. McCallum
Attorney.

UNITED STATES PATENT OFFICE.

HENRY G. ASHTON, OF BOSTON, MASS., ASSIGNOR, BY MESNE ASSIGNMENTS, TO THE ASHTON VALVE COMPANY, OF HARTFORD, CONN.

IMPROVEMENT IN SAFETY-VALVE ATTACHMENTS TO UTILIZE ESCAPE-STEAM.

Specification forming part of Letters Patent No. 186,783, dated January 30, 1877; Reissue No. 8,211, dated May 7, 1878; application filed April 24, 1878.

*To all whom it may concern:*

Be it known that I, HENRY G. ASHTON, of Boston, in the county of Suffolk and State of Massachusetts, have invented certain new and useful Improvements in Safety-Valve Attachments to Utilize Escape-Steam; and I do hereby declare that the following is a full, clear, and exact description thereof, that will enable others skilled in the art to which it appertains to make and use the same, reference being had to the accompanying drawings, and to the letters of reference marked thereon, which form a part of this specification.

The steam which escapes from the safety-valve of locomotives and all other steam-engines known to me has heretofore escaped into the open air. This is highly objectionable in locomotives, because of the noise, which, as well as the sight of it, has frequently caused damage by frightening teams and otherwise. Moreover, the steam thus escaping is entirely wasted.

The main object of my invention is to do away with all these objections; and my invention consists in a device, constructed substantially as described, for conducting the steam which escapes from the safety valve or valves to the tank which contains the feed-water, thereby preventing all visible escape of the steam, all the noise attending such escape, and utilizing a very large percentage of such steam by causing it to heat the feed-water.

The apparatus is exceedingly simple, as is obvious from the above description. It consists merely of a proper chamber about the valve, and proper pipes connecting this chamber with the feed-water, and a proper construction of the parts to counteract the ill effects of the steam which passes the valve and enters the chamber.

In the drawings, A indicates a locomotive; B, its tender; C, one of its safety-valves, and D a pipe connecting the valve-casing with the feed-water tank in the tender.

The best form of valve known to me for practicing my invention is shown in section in Fig. 2. It is too well known to need description, other than that its casing is closed sufficiently to compel the steam which escapes through the valve proper to pass through the pipe D into the feed-water, and also that the total pressure tending to lift the valve when on its seat is considerably less than the total pressure tending to hold up the valve when the steam is escaping, such valves being well known and commonly called "pop-valves."

The valve used in practicing my invention requires a much greater pop, or difference between the pressure tending to start the valve from its seat and the pressure holding the valve up or away from its seat, than any other valve known to me, for the reason that as soon as the valve rises to admit of the escape of steam necessary to relieve the boiler, the casing is filled with steam, which has at least the pressure due to the depth of water in the tender, and must necessarily have considerably more pressure, because in practice the pipe D cannot be much over two or two and a half inches in diameter. The pressure in the valve-casing aids the spring to close the valve, and the pop, or difference between the two pressures, must be sufficient to counterbalance this back pressure or added load upon the valve.

I have described the best form of my apparatus; but it is obvious that my invention is not confined to any one form or arrangement of parts, its distinguishing object being to conduct the steam which escapes through the safety-valve into the feed-water, instead of allowing it to escape into the open air.

I am aware of the English patent of Thomas Yarrow, No. 758 of 1857, and desire to disclaim the apparatus therein shown.

What I claim as my invention is—

The combination of the pop safety-valve and feed-water tank, as described, in order that the steam which escapes through the valve shall be conducted into the feed-water, as and for the purposes specified.

In testimony that I claim the foregoing I have hereunto set my hand this 9th day of April, 1878.

HENRY G. ASHTON.

Witnesses:
J. E. MAYNADIER,
GEORGE O. G. COALE.